United States Patent
Sato et al.

(10) Patent No.: US 7,764,305 B2
(45) Date of Patent: Jul. 27, 2010

(54) METHOD AND APPARATUS FOR GENERATING A REFERENCE TELEVISION SIGNAL

(75) Inventors: Norihiko Sato, Chiba (JP); Shinobu Kubota, Kanagawa (JP); Kazutomo Tohyama, Kanagawa (JP)

(73) Assignee: Tektronix, Inc., Beaverton, OR (US)

( * ) Notice: Subject to any disclaimer, the term of this patent is extended or adjusted under 35 U.S.C. 154(b) by 1023 days.

(21) Appl. No.: 11/286,041

(22) Filed: Nov. 23, 2005

(65) Prior Publication Data

US 2006/0132650 A1 Jun. 22, 2006

(30) Foreign Application Priority Data

Nov. 26, 2004 (JP) ............................. 2004-342564

(51) Int. Cl.
    *H04N 5/04* (2006.01)
(52) U.S. Cl. ..................................... 348/181
(58) Field of Classification Search ................ 348/181, 348/180, 189, 512, 505, 500, 518, 194
    See application file for complete search history.

(56) References Cited

U.S. PATENT DOCUMENTS

| | | | | |
|---|---|---|---|---|
| 4,599,650 A | * | 7/1986 | Wilkinson | .................. 348/518 |
| 4,618,880 A | * | 10/1986 | Pires | .......................... 348/194 |
| 4,725,895 A | * | 2/1988 | Miyamoto et al. | ............. 386/8 |
| 4,751,565 A | * | 6/1988 | Emmons et al. | ............. 348/539 |
| 4,947,241 A | * | 8/1990 | Basile et al. | ................. 348/605 |
| 4,952,883 A | * | 8/1990 | Enomoto et al. | ............... 327/3 |
| 5,764,284 A | * | 6/1998 | Stoker | ......................... 348/181 |

* cited by examiner

*Primary Examiner*—Paulos M Natnael
(74) *Attorney, Agent, or Firm*—Matthew D. Rabdau

(57) ABSTRACT

CW lock is conducted with less manual operation. A first input 22 receives a black burst (BB) signal from a key TV station. A second input 30 receives a continuous wave (CW) signal having an accurate, known frequency. A phase adjust signal generator 24 generates a reset signal having a known phase relationship with regard to the key TV station BB signal. The reset signal is used as a phase adjust signal. A PLL 32 receives the CW signal to provide clock. A counter 34 receives the clock and provides a frame pulse signal for synchronizing the key and local TV signals at a local TV station wherein the BB signal of the local station may be derived from the frame pulse signal. The counter 34 uses the reset signal to adjust the phase relationship between the key TV station BB signal and the frame pulse to a desired phase relationship based upon the key TV station BB signal.

8 Claims, 3 Drawing Sheets

METHOD AND APPARATUS FOR GENERATING A REFERENCE TELEVISION SIGNAL

BACKGROUND OF THE INVENTION

The present invention relates to methods and apparatus for generating a reference television signal derived from a continuous wave (CW) signal used in a local TV station, especially, for automatically adjusting the phase with respect to a reference television signal from a key TV station.

In national television broadcasting, key TV stations usually located in major metropolitan areas distribute TV programs to local TV stations of a national network. In this case, the vertical sync signals of the TV signals from the key TV station and local TV stations must be synchronized to avoid disturbing the video picture when it is switched from a key TV station's video to a local TV station's video and vice versa. Therefore, the local TV stations have their black burst (BB) signal (hereinafter local TV station BB signal) synchronized with a BB signal from the key TV station (hereinafter key TV station BB signal)

For example, the local TV station may continuously receive the key TV station BB signal to obtain GenLock with the local TV station BB signal wherein the GenLock is disclosed in U.S. Pat. No. 4,751,565 for example. The non-stop receiving of the key TV station BB signal, however, is not economical because it uses a commercial communication line. Then, it sometimes receives the key TV station BB signal for the Genlock to synchronize with the local TV station BB signal to reduce the communication cost.

A conventional method of synchronization between the key and local TV station BB signals is described below with referring to FIG. 1. The local TV station has a high precision oscillator 10 that generates a continuous wave (CW, or a sine wave) having a frequency that is very accurately maintained. A reference television signal generator 12 generates a black burst signal (local TV station BB signal) of which period is known and maintained very accurately with respect to the precision CW signal received from the high precision oscillator 10. The reference television signal generator 12 has a delay line, which a user can adjust using buttons 13 to adjust the delay of the output BB signal to accomplish the phase adjustment. A waveform monitor 14 receives a key TV station BB signal at the first input channel and the local TV station BB signal from the reference television signal generator 12 at the second input channel. A screen 16 of the waveform monitor 14 shows waveforms of the first and second channels. The user manually operates the phase adjust buttons 13 while watching the screen 16 to align the phases of the vertical sync signals of the key and local TV station BB signals. It produces a local TV station BB signal with a vertical sync signal that is aligned with that of the key TV station BB signal. After the phase alignment, the local TV station may disconnect the commercial line to receive the key TV station BB signal. Since the CW signal is very accurate, the local TV station BB signal keeps the synchronization with the key TV station BB signal without the phase alignment process for a while, which is called "CW lock". The phase alignment process with the key TV station BB signal may be repeated at predetermined intervals to keep the key and local TV station BB signals synchronized.

Alternatively, a frame pulse may be produced instead of the BB signal from the reference television signal generator 12 and the process may be applicable to any formats including SDI as well as NTSC. If the reference television signal generator 12 provides a signal for which the phase relationship with the key TV station BB signal is determined and the period is known, a local TV station BB signal could be easily derived from the signal.

Since the CW signal does not have a vertical sync signal etc., the CW signal does not provide a phase reference to determine the phase of a reference television signal, such as BB signal or frame pulse etc., derived from the CW signal. Therefore, manual phase alignment with the key TV station BB signal while watching the screen is necessary as shown in FIG. 1, which is troublesome. It would be easy to synchronize the key and local TV station BB signals if the local station always receives the key TV station BB signal through a commercial line, but it would not be economical. Therefore, what is desired is to generate a reference signal for a local TV station, such as a BB signal, a frame pulse, etc., that is automatically synchronized with a key TV station BB signal.

SUMMARY OF THE INVENTION

The present invention relates to a reference television signal generator suitable for use at a local TV station that synchronizes the television signal with that of a key TV station. A first input receives a first reference television signal, such as a black burst signal, from the key TV station. A second input receives a reference frequency signal with a known frequency, which is accurate. The reference frequency signal may be a continuous wave (CW) signal and may not include a synch signal of a TV signal. A phase adjust signal generator generates a phase adjust signal with a known phase relationship relative to the first reference television signal. A signal generator receives the reference frequency signal and generates a second reference television signal that is used for synchronizing a TV signal of the local TV station with that of the key TV station. The signal generator uses the phase adjust signal to adjust the phase relationship between the first reference television signal and the second reference television signal to a desired phase relationship based upon the first reference television signal.

Method for generating a reference television signal are also provided. Upon receiving a first reference television signal, a phase adjust signal having a known phase relationship with respect to the first reference television signal is generated. A second reference television signal is generated upon receiving a reference frequency signal. Then, the phase relationship between the first reference television signal and the second reference television signal is adjusted to a desired phase relationship using the phase adjust signal.

The reference frequency signal may be a CW signal and may not include synch information, such as a synch signal, but the frequency is maintained very accurately so that the second reference television signal can be maintained in a desired phase relationship with the first reference television signal for some time even without Genlock operation. Occasionally, it receives the first reference television signal to adjust the phase of the second reference television signal to maintain the desired phase relationship between the first reference television signal and the second reference television signal. This phase adjustment is automatically conducted so that manual operation is reduced or eliminated, thereby providing an easy and accurate method of adjusting the phase. The first reference television signal is used only a few times, so it is not necessary for the local TV station to use commercial communication line to receive the first reference TV signal, and thus reducing the operating cost of the broadcasting equipment.

The first reference television signal may typically be a black burst signal from the key TV station, it may be a usual television signal including color and intensity information if a circuit for deriving black burst signal or synch signal is provided. Anyway, the first reference television signal should be a reference signal for TV synch from the key TV station. The second reference television signal may typically be a black burst signal used for synch reference at the local TV station, it may, however, be a frame pulse signal for example. The format of the second reference television signal may be various formats, such as NTSC, SDI, etc. since if the phase relationship with the first reference television signal and the period are known, the black burst signal for the local TV station can be easily derived from it.

The objects, advantages and other novel features of the present invention are apparent from the following detailed description when read in conjunction with the appended claims and attached drawings.

DETAILED DESCRIPTION OF THE INVENTION

Figure 1:
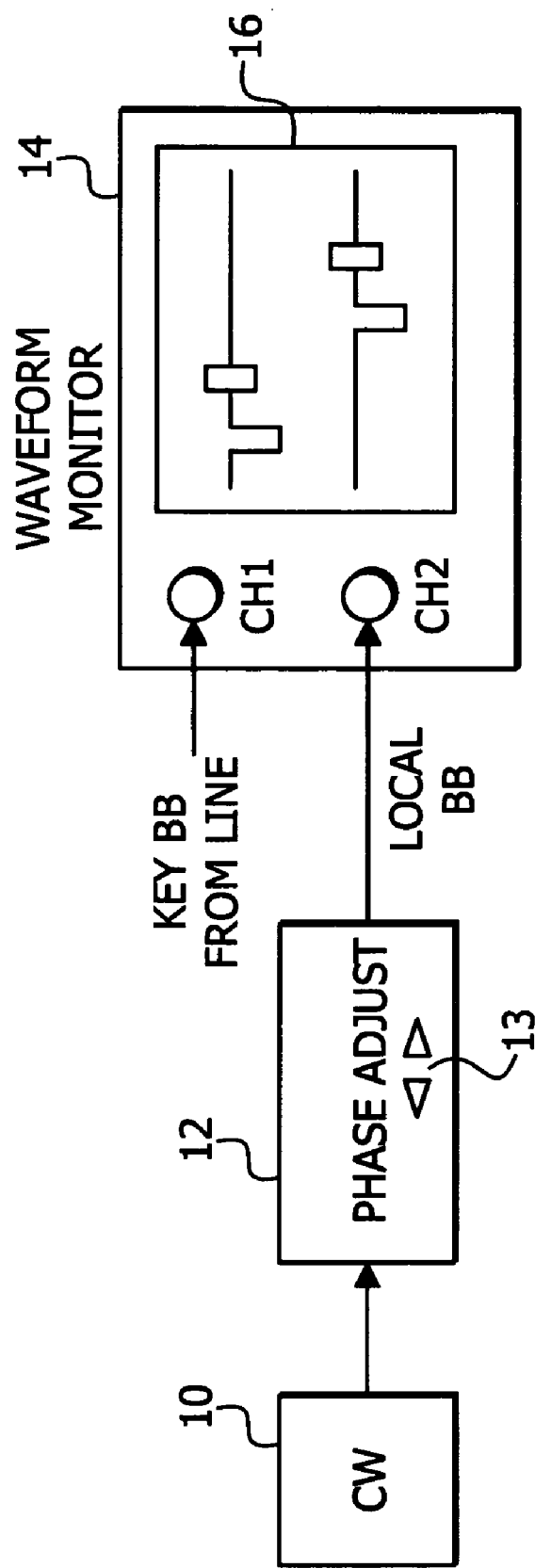
FIG. 1 shows a conventional phase alignment between key and local TV station BB signals
Figure 2:
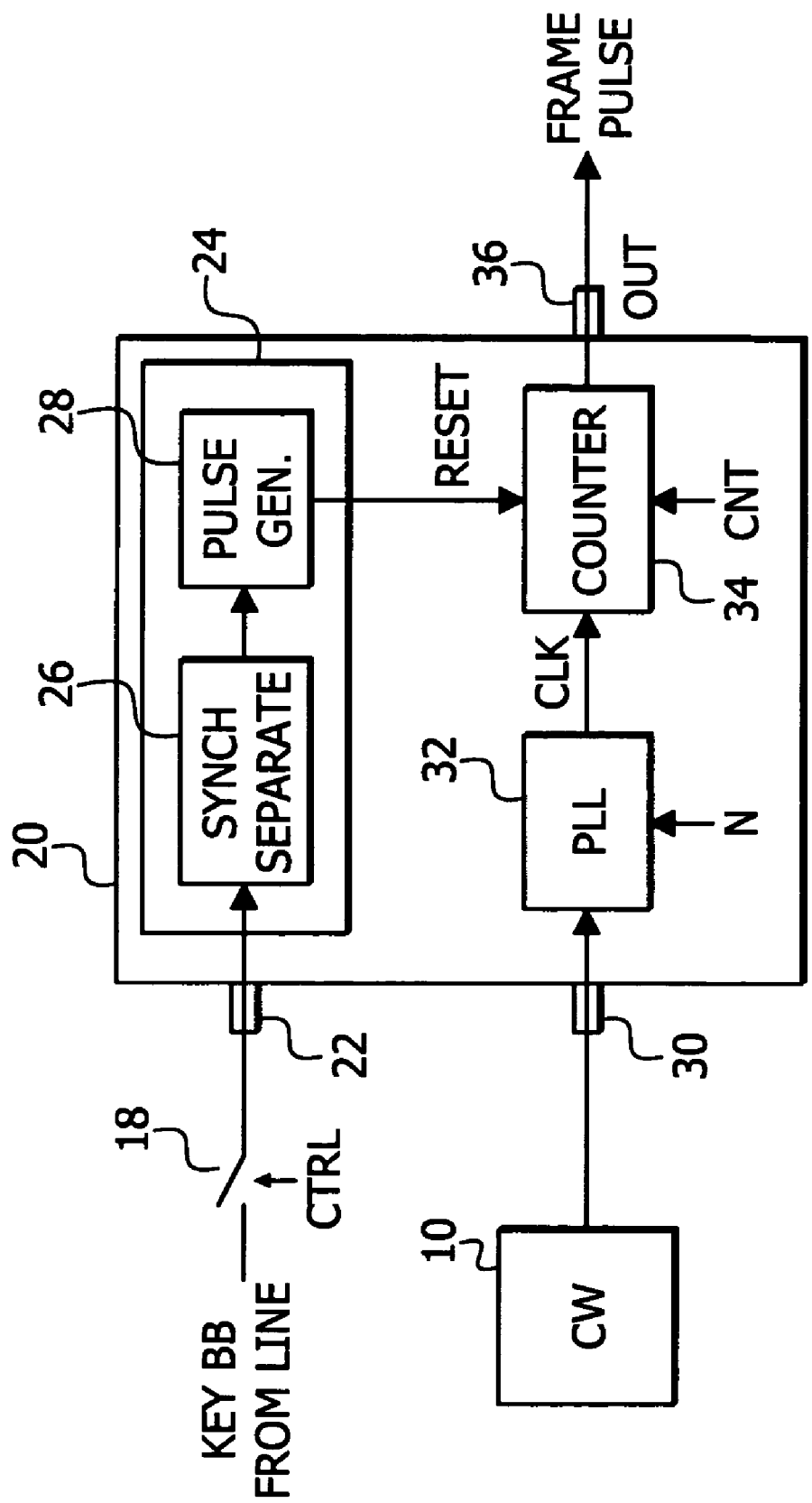
FIG. 2 is a block diagram of a reference television signal generator according to the present invention.

Referring to FIG. 2, an embodiment of a television reference signal generator 20 according to the present invention may have well known control means including microprocessor, memory, hard disk drive etc. used to control operations described below(not shown). A switch 18 turns ON when it is requested and couples a commercial communication line to a first input 22 of the television reference signal generator 20 to receive a black burst signal (key TV station BB signal, or first reference television signal), for example from a key TV station. The key TV station BB signal is provided to a phase adjust signal generator 24. The coupling switch 18 may be ON for a predetermined time at regular intervals or setting times. The phase adjust signal generator 24 has a sync separator 26 and a pulse generator 28. The sync separator 26 separates a sync signal from the key TV station BB signal and the pulse generator 18 produces a reset signal (phase adjust signal) having a known phase relationship with respect to the sync signal. For example, if the pulse generator 18 generates the reset signal at the first line of the television signal, it would be a frame pulse as described below. The sync signal may also be used as the reset signal.

A second input 30 receives a CW signal. The CW signal is typically a sine wave and the frequency is maintained very accurately. A phase lock loop (PLL) circuit 32 receives the CW signal to provide a clock CLK with a known frequency. The frequency of the clock CLK is also maintained precisely since the CW signal is very precise. The local TV stations may use different frequencies of the CW signals respectively. Therefore it would be better that the dividing ratio N of the PLL 32 can be selectable and controlled by the microprocessor, etc. according to a user setting, which makes it possible to use the apparatus at more local TV stations.

A counter 34 receives the clock CLK and counts it down from an initial count number CNT and if it reaches to zero it provides a pulse through an output 36 and again sets the initial count number CNT to count it down repeatedly. The pulse may be used as the frame pulse, for example, so that the microprocessor sets a proper initial count number CNT to the counter 34 depending on a user setting and the frequency of the clock CLK.

If the counter 34 receives the reset signal from the phase adjust signal generator 24, the count value is forced to become zero even if it is on the way of the counting and the counter 34 outputs a pulse (frame pulse). The reset signal has the known phase relationship with the key TV station BB signal and then the frame pulse is also maintained in known phase relationship with the key TV station BB signal.

The frame pulse may be used to generate a local TV station BB signal by using any suitable circuit known in the art(not shown). The local TV station BB signal is synchronized with the key TV station BB signal since the phase relationship between the frame pulse and the key TV station BB signal is known. If the generated frame pulse is for the NTSC format, sync signals for other TV formats, such as SDI, may be produced from the frame pulse.

Figure 3:
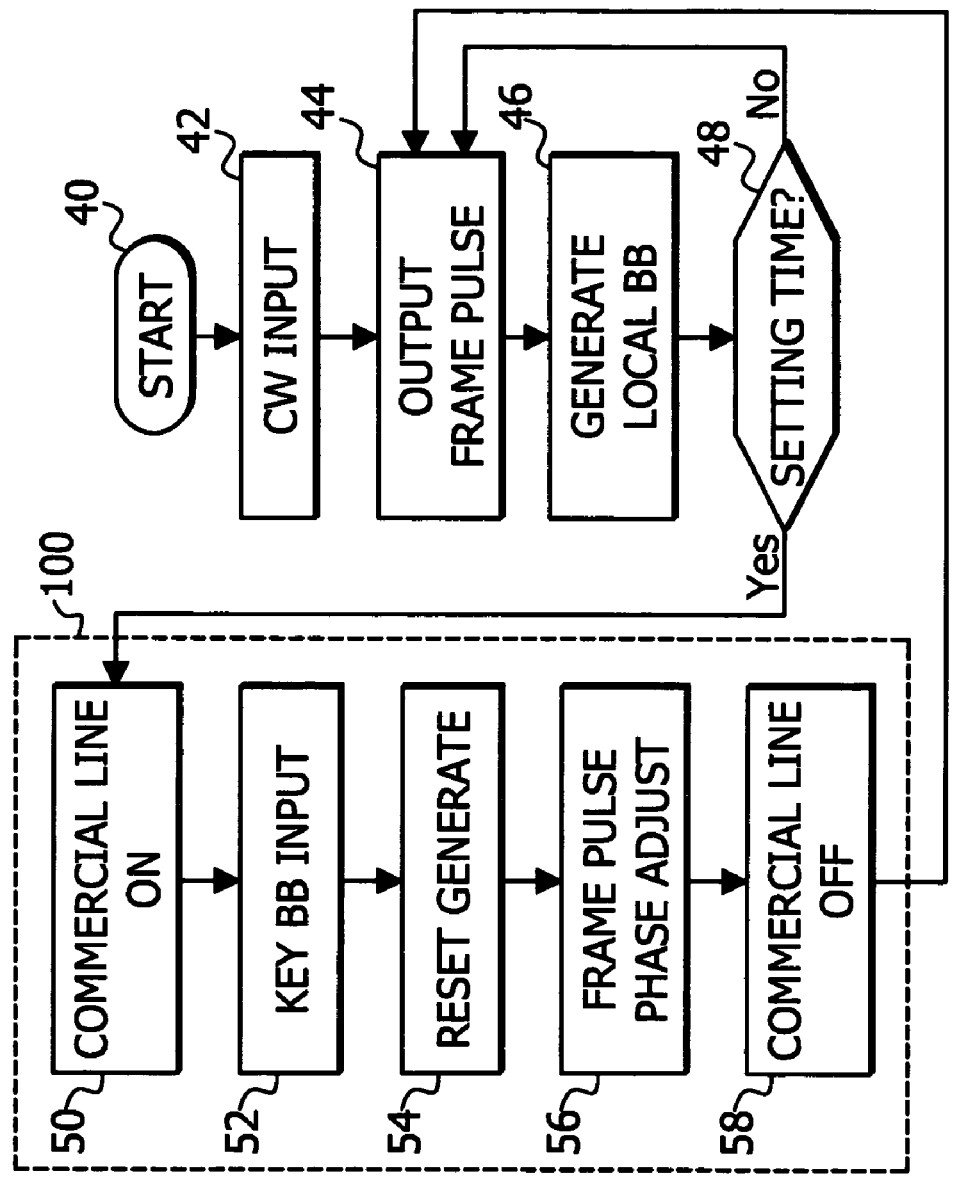
FIG. 3 is a flowchart of a method for generating a reference television signal according to the present invention.

Referring to FIG. 3, when the reference signal generator processsstarts, the television reference signal generator receives the CW signal (step 42) and outputs the frame pulse (step 44). The local TV station BB signal may be derived from the frame pulse (step 46). In step 48, it determines whether it has reached a user-designated time, if not, it repeats the steps 44 and 46. When it gets to the user-designated time, the process advances to a step 50 and the commercial line coupling switch 18 turns ON to receive the key TV station BB signal (step 52). The phase adjust signal generator 24 derives the reset signal (phase adjust signal) from the key TV station BB signal and resets the counter 34 to adjust the phase of the frame pulse (step 56). Then, the commercial line is turned off (step 58). The steps from the step 50 to the step 58 constitute a phase adjust process 100. The user may decide how often the process 100 conducts based upon the accuracy of the CW signal and actual phase deviance. Alternatively, the user may conducts the phase adjust process 100 anytime the user feels it is necessary without designating the time. The embodiment of FIG. 3 conducts the process 100 only one time but the reset signal may be generated repeatedly as long as the commercial line is ON.

As described, the present invention synchronizes reference television signals of local and key TV stations with good accuracy without troublesome manual processing even if the reference television signal (or black burst signal) from the key TV station is not always provided. If the switch 18 for coupling the apparatus and the commercial line to receive the black burst signal from the key TV station is controlled to become automatically ON for a predetermined time, it would further reduce manual operation.

What is claimed is:

1. A reference television signal generator comprising:

a first input receiving a first reference television signal;

a second input receiving a reference frequency signal having a known accurate frequency;

a phase adjust signal generator that generates as a phase adjust signal a frame pulse having a known phase relationship with the first reference television signal; and a signal generator generating a second reference television signal wherein the signal generator adjusts the phase relationship between the first reference television signal and the second reference television signal to a desired phase relationship using the frame pulse when the first reference television signal exists at the first input and the signal generator locks the phase of the second reference television signal to that of the reference frequency signal when the first reference television signal does not exist at the first input.

2. The reference television signal generator as recited in claim 1 wherein the first reference television signal is controlled to be provided to the first input at a predetermined time.

3. The reference television signal generator as recited in claim 1 wherein the phase adjust signal generator derives a synch signal from the first reference television signal and generates the frame pulse from the derived synch signal.

4. The reference television signal generator as recited in claim 1 wherein the signal generator has a counter that generates a pulse when the counted number reaches a predetermined number or the counter receives the frame pulse.

5. The reference television signal generator as recited in claim 4 wherein the pulse that the counter generates is a frame pulse for generating the second reference television signal.

6. The reference television signal generator as recited in claim 1 wherein the first reference television signal is a black burst signal from a key TV station.

7. The reference television signal generator as recited in claim 1 wherein the reference frequency signal is a continuous wave signal.

8. The reference television signal generator as recited in claim 1 wherein the second reference television signal is used at a local TV station.

\* \* \* \* \*